Dec. 29, 1931.  F. J. OVEN  1,838,496
GASKET
Filed March 5, 1929
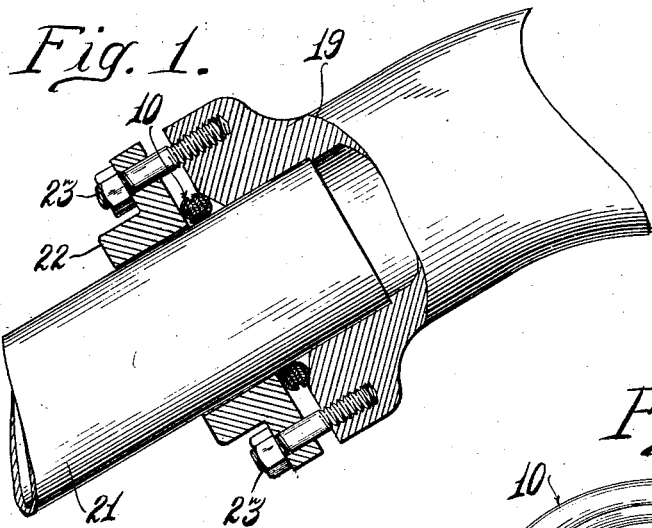
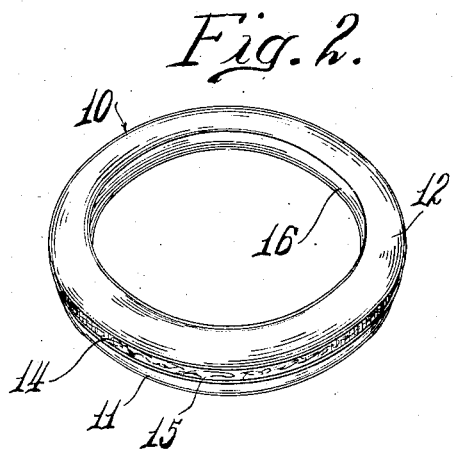
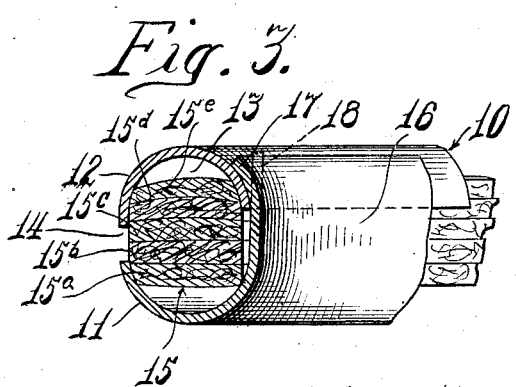
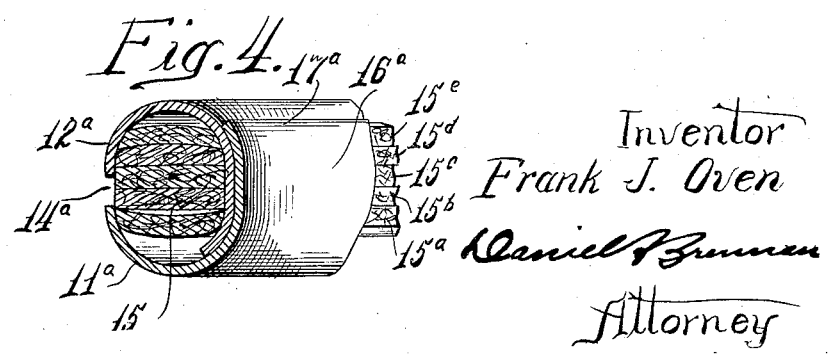
Inventor
Frank J. Oven
Daniel Brennen
Attorney Patented Dec. 29, 1931

1,838,496

UNITED STATES PATENT OFFICE

FRANK J. OVEN, OF CHICAGO, ILLINOIS, ASSIGNOR TO VICTOR MANUFACTURING & GASKET CO., A CORPORATION OF ILLINOIS

GASKET

Application filed March 5, 1929. Serial No. 344,527.

The invention relates to gaskets and more particularly gaskets adapted to slide or tilt, to effect self adjustment.

An object of the invention is to provide a novel gasket for use as a sealing element between, as for example, the exhaust manifold and exhaust pipe of an internal combustion engine, that will tilt or slide, or tilt and slide to adjust itself to the angularitly of surfaces between which it lies.

Another object of the invention is to provide a novel two piece telescoping gasket, seamless on its inner circumference, and having an outer peripheral opening to permit axial contraction and expansion of said pieces relative to each other.

Another object of the invention is to provide a novel gasket suitable for insertion between two slightly out of parallel surfaces, that will adjust itself to said surfaces without the undue pressure, commonly necessary in one piece gaskets, in which distortion, by squeezing of the metal, is unavoidable in accomplishing a similar purpose.

Another object of the invention is to provide a two part, telescoping, novel gasket with means for positively limiting the inward movement of its parts relative to each other.

Another object of the invention is to provide a novel gasket arranged for axial expansion, having means for positively limiting the range of said expansion and means for yieldingly limiting its range of axial contraction.

Another object of the invention is to provide a novel, self adjusting gasket, that is simple and inexpensive of manufacture, efficient in use and adjustable without a distortion of the metal shells of which it is composed.

Gaskets of known construction commonly are made of one piece of metal with an external annular peripheral opening. In such construction, in order to effect adjustment between surfaces out of parallel, excessive pressure is necessary to effect a seal and is accompanied by a corresponding injury to the metal. Said gaskets are also expensive of manufacture and inefficient as a seal. Said objections are overcome in the present invention, illustrated in the accompanying drawings, in which:

Fig. 1 is a cross sectional view of the gasket embodying the features of the invention, shown in place between the exhaust manifold outlet and exhaust pipe coupling.

Fig. 2 is a perspective view of the gasket.

Fig. 3 is an enlarged, fragmental, transverse, sectional schematic view of the gasket.

Fig. 4 is a view similar to Figure 3 of a modified form of the invention.

The gasket 10 as illustrated in Figs. 1, 2 and 3, comprises telescoping shells 11 and 12, forming an enclosed space 13, open at its outer periphery as indicated at 14. A refractory filler 15, preferably asbestos, although any other refractory material may be used, is carried in said enclosed space, and as here illustrated, comprises a plurality of superimposed annular layers 15a, 15b, 15c, 15d and 15e although any convenient number of layers may be used.

The substantially J cross section shell 11 is provided with an annular flange 16, extending upwardly from and around its inner circumference. The other, or companion shell 12, is telescopingly fitting to slide over this upstanding flange 16, to provide for its axial adjustment with respect to the shell 12. The circumference of the opening of the shell 12 is flush with and slidingly fitted over the circumference of the upstanding flange 16, and the uper portion, of this flange 16, is bent outwardly over the shell 12 as indicated at 17, providing a stop for limiting outward sliding of the shell 12, relative to the shell 11.

In the manufacture of the gasket the shell 12 is placed over the vertical flange 16, as indicated in dotted lines at 18. The outer end of said flange is then bent outwardly over the shell 12 to provide means for limiting the range of axial sliding of the shells and to hold the refractory layers in place.

The exhaust manifold outlet 19 is counter bored on its end to provide a centering seat for the gasket 10 after the exhaust pipe 21 has been put in place, within the said manifold outlet.

The flange coupling 22 is secured to the manifold by studs 23 which extend through openings in the coupling. In drawing the coupling toward the manifold to seat the gasket it sometimes happens, due to the unequal taking up of the nuts and the clearance between the exhaust pipe 21 and opening in the coupling 22 that the faces of said coupling and manifold are forced out of parallel. In such event the shells 11 and 12 of the gasket 10 are tilted with respect to each other to compensate for this condition and still provide a tight seal, whereas in prior structures the metal of the gasket had to bend or squeeze and in so doing an imperfect seating was the result.

The modified form of gasket shown in Fig. 4 is in all respects similar to the preferred form except that the shell 12a is also of substantially J cross section and its lower end is arcuated to fit the shell 11a and engages the portion 16a over its entire length.

In this form of gasket, it requires slightly more pressure to effect tilting and telescoping.

I claim:

1. A gasket comprising annular shells of substantially U cross section, the inner circumference of one being extending and forming a projecting flange slidingly engaging the inner circumference of the other shell, the outer edges of the shells being spaced apart and forming an annular opening between the shells about the gasket.

2. A gasket comprising annular shells of substantially U cross section, one shell having an upstanding circumferential flange and the other shell being telescopically disposed within said flange, the marginal edge of said flange being bent over the other shell and preventing separation of the shells.

3. A gasket comprising companion annular shells of substantially U cross section, one having an inner upstanding circumferential flange and the other mounted for sliding thereon forming an inclosed space having an annular peripheral opening, one end of said flange being bent to contact over the other shell to limit its outward sliding.

4. A gasket comprising telescoped annular shells of substantially U cross section having a peripheral opening between adjacent edges thereof, one shell having an inner upstanding circumferential flange and the other shell being disposed for tiltingly sliding therein, the marginal edge of said flange being bent over the other shell to prevent separation of the shells.

5. A gasket comprising telescoped annular shells of substantially U cross section defining an inclosed space having an annular peripheral opening and a filler within said inclosed space and extending thereacross but of less thickness than the height of said inclosed space to provide a clearance between said shells and the sides of said filler.

6. A gasket comprising two annular and oppositely disposed metallic shells, said shells being curved in cross-section and interfitting one within the other at portions of the inner sides thereof to limit outward relative movement of the shells and being telescopically movable inwardly under compressive pressure.

In testimony whereof I affix my signature at 10 South LaSalle Street, Chicago, Illinois.

FRANK J. OVEN.